United States Patent
Moore et al.

[15] 3,670,380
[45] June 20, 1972

[54] FACE MILLING TOOL

[72] Inventors: Arthur Ivan Walter Moore; John Howard Porter; Richard Frank Vearncombe; Edward Karl Reiher, all of Staveley Lodge, Melton Mowbray, Leicestershire, England

[22] Filed: Jan. 10, 1969

[21] Appl. No.: 17,354

Related U.S. Application Data

[63] Continuation-in-part of Ser. No. 533,107, Jan. 24, 1966, abandoned.

[30] Foreign Application Priority Data

Jan. 24, 1965 Great Britain.......................34,571/64

[52] U.S. Cl..............................................................29/105
[51] Int. Cl..........................................................B26d 1/00
[58] Field of Search.........................................29/105, 105.1

[56] References Cited

UNITED STATES PATENTS 2,645,003  7/1953  Thompson et al. ........................29/105
2,678,487  5/1954  Onsrud ......................................29/105

*Primary Examiner*—Harrison L. Hinson
*Attorney*—Watson, Cole, Grindle & Watson

[57] ABSTRACT

A face milling tool comprises a holder and a bit of slice-like form of circular or lobed outline detachably secured on a seating by a screw or the like traversing a central aperture and presented so that the side wall is the rake face and the end face is the clearance face. The bit can be indexed on the securing means. A lobed bit has convex cutting edges of much larger radius than the average radius of the bit.

8 Claims, 11 Drawing Figures

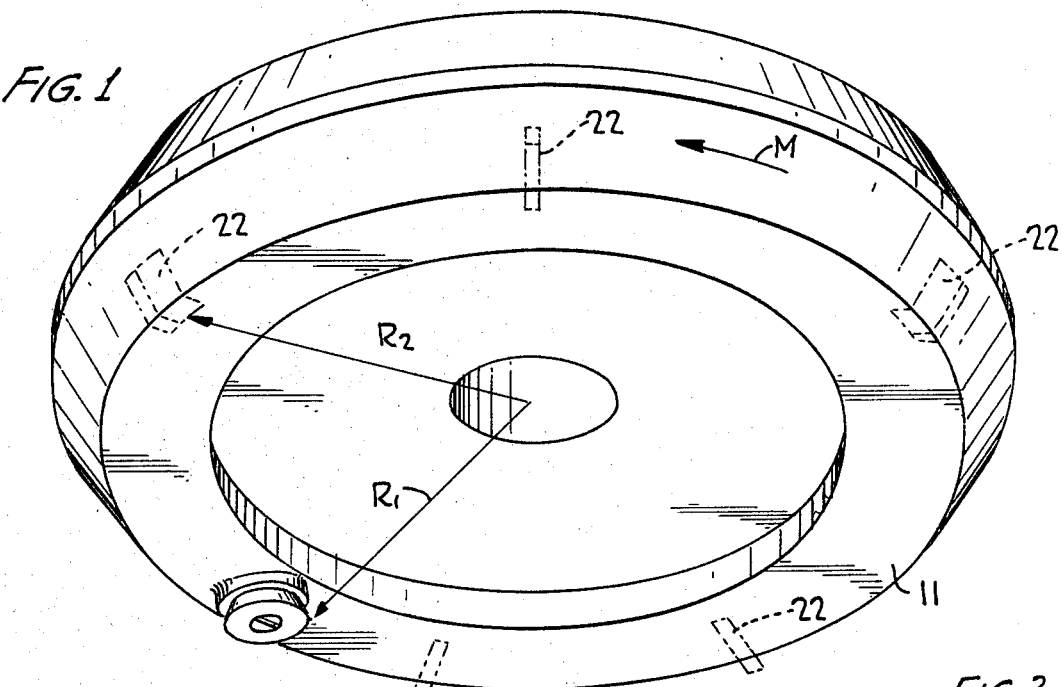
FIG. 1
FIG. 2
FIG. 3
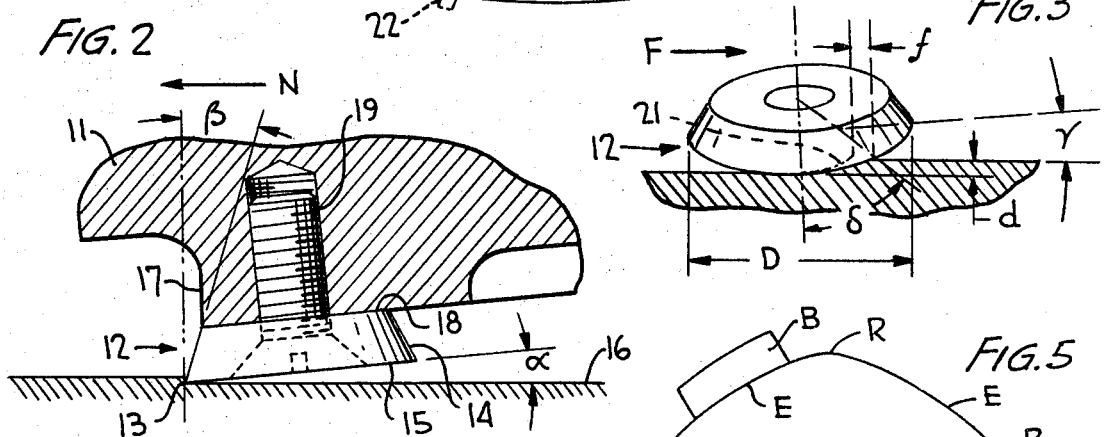
FIG. 4
FIG. 5
INVENTORS,
ARTHUR IVAN WALTER MOORE
JOHN HOWARD PORTER
RICHARD FRANK VEARNCOMBE
EDWARD KARL REIHER
BY Watson, Cole, Grindle & Watson
ATTORNEYS

FACE MILLING TOOL

This application is a continuation-in-part of application, Ser. No. 533,107 filed Jan. 24, 1966, now abandoned.

This invention relates to face milling tools primarily for metals, that is tools comprising a body securable to the end of a rotating spindle in a predetermined relationship to the axis of rotation thereof and a short cutting edge carried by the body at a radial distance from the axis of rotation on the side of the body away from the spindle, so that as the body is rotated by the spindle the cutting edge describes a circle about the axis of the spindle. All parts of the body are axially behind the cutting edge so that it is free to engage and machine the surface of a workpiece held in the machine in which the spindle rotates. Since the cutting edge is short it takes a comparatively narrow cut and the tool is used with a transverse feed, i.e. the feed direction relative to the workpiece has a component perpendicular to the general cutting direction and is parallel to the machined surface.

Within the above field the invention is concerned with face milling tools comprising a body in the form of a holder and a cutting edge formed on a separate bit detachably secured to the holder.

It has hitherto been proposed to make a tool bit for a variety of metal cutting tools of slice-like form, that is to say it is bounded by two generally flat parallel end faces and a side wall, at least one cutting edge having a convex contour over at least the part of which first engages the workpiece being formed by part of the edge at the junction of the side wall and at least one of the end faces, and is of a thickness which is small compared with its other dimensions, and to secure it detachably to a holder by means traversing a central aperture through it. If such a bit is of simple form and small size it is cheap to produce and it is therefore economic to throw it away when blunt or worn rather than regrinding it, especially if as has also been proposed it is of simple circular or polygonal form and can be indexed to bring each of a plurality of cutting edge sections or cutting edges into position. Not only is the expense of regrinding saved but the problem of holding the bit with the cutting edge in correct position is simplified because all bits will within manufacturing tolerances be of the same shape and size.

In general terms, the two surfaces at the junction of which the cutting edge of a metal cutting tool is formed are one the rake face against which the chip impinges and the other the clearance face which is the face which is closer to the workpiece and which is inclined to the machined surface at a low angle which takes it out of contact with the workpiece behind the cut.

In the case of a slice-like bit as hereinabove defined, according to the way it is presented by the holder and the machine it is possible for one end face to be the rake face and the side wall to be the clearance face, or for the side wall to be the rake face and the end face to be the clearance face. As hitherto proposed the former presentation has been the commoner, though the latter presentation has been proposed. In the specific case of face milling cutters a slice-like bit has always been presented so that the end face is the rake face and the side wall is the clearance face. The present invention presents a slice-like bit in a face milling cutter so that the side wall is the rake face and the end face the clearance face. This not only gives the advantage above set forth of a slice-like bit that it can economically be thrown away when blunt or worn, but also a certain advantage as regards the cutting action hitherto only realized in the case of a face milling cutter with a bit which was not of slice-like form held by means traversing a central aperture in it but which had a cutting edge similarly formed to that of a slice-like bit and was of circular outline. This advantage is that as seen looking in the cutting direction the cutting edge appears of much larger radius than it has as seen in plan on the slice. To clarify this point a circular form in plan will be assumed, i.e. that the slice is a simple circular disc. When presented in the manner specified, the cutting edge as seen in the cutting direction (in other words the cross section of the cut) will be of very shallow part elliptical form and since only a small portion at the flattest part of the ellipse will be actually cutting because a depth of cut only allowing a short portion of the edge of the bit to cut can in fact be employed this short portion as seen in the cutting direction will approximate to a circular arc of very much greater radius than that of the disc as seen in plan. Such a cross section of cut gives a high finish not only because of the large effective radius but also because the thickness of the chip diminishes to zero at the greatest depth where the part of the cutting edge which is leading is cutting while remote from this point the part of the edge which trails in the cutting direction but leads in the feed direction effects a coarser cut i.e. removes more material without the final finish at the greatest depth being impaired. With a continuously curved cutting edge there is no precise point of division between the finishing part and the coarse cutting part of the edge but it is convenient to use these terms for the different parts of the edge.

The prior proposal referred to gave the same result as regards cutting action but only at much greater expense because the bit instead of being slice-like and detachably secured by means traversing a central aperture was permanently secured in some unspecified manner presumably brazing to a seating in the end of a cylindrical body clamped in a corresponding bore in the milling tool holder, this bore being tilted forward to ensure that only the leading part of the edge engages the workpiece to give a narrow cut. The present invention combines the advantages of a slice-like bit detachably secured by means traversing a central aperture therein with the advantage in a face milling cutter of presentation so that the wall is the rake face and the end face is the clearance face.

In the case of a slice-like bit as hereinabove defined the side wall will intersect the outer face of the bit in an edge which extends all round but the term cutting edge used herein means the total length of that portion of the aforesaid edge which is intended actually to engage the workpiece and which is always a small fraction of the total periphery.

If the depth of material to be removed at one pass is greater than the slice-like bit can deal with, the holder can also carry one or more roughing bits which precede the slice-like bit.

Though the angle between the clearance face and the workpiece may be as low as 1° or 2° it is possible to increase this angle to a value well above the more usual clearance angle value of about 5°, say up to 40°, as by this means the depth of cut can be increased other factors remaining the same; in some cases as will be explained it may then be desirable to depart from an overall flat clearance face of the bit by providing a narrow land adjacent part (in particular the coarse cutting part) or the whole of the cutting edge, which reduces the true clearance angle. Such a land may be flat or curved in section according to the manner in which it is produced. Another factor which enables the depth of cut to be increased is to present the bit so that transversely with respect to the cutting direction the clearance face of the bit is not arranged parallel to the general surface to be produced on the workpiece but is tilted away from the feed direction at a small angle. This angle may be as much as 30° but will usually not exceed 5°.

While these various factors enter into the determination of the depth of cut which can be employed, another factor of prime importance is the maximum angle of obliquity of the cutting edge, which with a convexly cutting edge can be defined as the complement of the angle between the tangent to the cutting edge of the outer end of the coarse cutting part i.e. the point at which the thickness of the chip is greatest, and the direction of cutting i.e. the tangent at the point of engagement of the outer end of the coarse cutting part with the workpiece to the circle described by this outer end.

If the obliquity is too great, where this end of the cutting edge first strikes the workpiece (a condition which cannot be avoided if only at the commencement of machining) it cannot cut but only strikes the workpiece with consequent unsatisfactory results.

It is for this reason that the present invention provides for the form of the convex contour of the bit to be such that the maximum obliquity does not exceed a value which would prevent effective cutting being achieved in all circumstances of use. This maximum can quite conveniently be defined not in terms of the complement to the angle between the tangent to the outer end of the cutting edge in the direction of cutting but in terms of the actual angle so that maximum obliquity corresponds to minimum value of this angle. A convenient practical value is a minimum of 30°, and desirably this angle is more than 30°.

The use of securing means traversing a central aperture in the bit for example a central clamping screw enables the bit to be angularly adjusted (indexed) about the axis of the aperture. This not only enables small adjustments in the presentation of the bit to the workpiece to be made, but if the complete outline of the bit is suitably shaped, enables a plurality of cutting edges to be brought into action in succession as each edge becomes blunt or worn.

A complete circular outline can be indexed in this way though care is needed to ensure that at least the whole of the finishing part of the edge is replaced by a new part. A cutting edge which is not a simple circular arc centred in the aperture may be used however and in such cases the total outline will be lobed. One advantage of this is that for a given length of cutting edge and limit of obliquity the volume of the bit becomes smaller thus economising in the expensive material of which the bit is usually made and the proportion of this material which does not take part in the actual cutting.

Limitation of the minimum angle between the tangent to the end of the cutting edge and the direction of cutting to 30° means that with a circular outline, the angle subtended by the cutting edge from the foremost point to the end of the coarse cutting part is limited to 60° and often only a smaller subtended angle can usually be employed for other reasons, i.e. obliquity is not always critical. This limits the length of the cutting edge as a function of the diameter of the bit, or in other words the greater the length of the cutting edge required the greater must be the diameter of the bit.

One way in which the length of cutting edge can be increased for a given diameter of the bit (or in other words for a given length of cutting edge the diameter and therefore the volume of the bit can be reduced), is to modify a simple circular arcuate form by shaping the outline of the cutting edge as a continuous curve of decreasing curvature in proceeding from the finishing to the coarse cutting part. There may be a continuous change of curvature as with a true elliptical outline, or the curvature may decrease in steps so that the outline becomes an oval consisting for example of two or three circular arcs as in common drawing office approximations to an ellipse. Such forms can be repeated two or more times up to perhaps six over the complete periphery. With six lobes of this form the angular length of the cutting edge is not increased compared with what can be used in the limit with a circular outline but the obliquity at the end can be so brought to well below the limiting value of 30°, or the volume be reduced compared with a complete circular outline. Other possibilities are to make the cutting edge up of several arcs not running into a continuous curve or of a convex curved finishing part, e.g. a circular arcuate part, and a coarse cutting part of one or more straight sections. Such forms are not difficult to produce and again can be arranged for indexing.

From the point of view of quality of finish it will be clear that the larger the radius of a simple circular form cutter, the larger will be the effective radius of the cutting edge as seen in the cutting direction. However mere increase in radius increases the size and cost of the bit. A lobed form which gives the same advantage without increasing the size of the bit has lobes each having an edge of larger radius (but still of convex form suitably circular arcuate form) than the average radius of the disc. There may be any convenient number of lobes but six is preferred. Below six the ratio of usable length of cutting edge to volume of bit is lower and therefore less economical than it need be. Above six it becomes necessary to increase the average radius of the disc for a given length of cutting edge.

The prior proposal above referred to proposed a polygonal outline exemplified by a hexagon as an alternative to a circular outline but this was straight sided. Such a form of cutting edge cannot give a cut which diminishes to zero at the greatest depth of cut and thus does not satisfy an essential condition for good finish.

Another point of importance is the rake angle of the bit. The side wall section in planes perpendicular to the clearance face of the bit is desirably straight and it is directed so that in conjunction with the clearance angle measured in a plane through the cutting direction it gives the desired rake angle in the last mentioned plane, i.e. front rake angle. Thus if the section of the side wall is normal to the flat end faces of the bit so that the bit is a cylinder in the case of a circular outline, the rake will be negative and the negative rake angle will be equal to the clearance angle (assuming the whole clearance face is flat). If a rake angle of different value from that of the clearance angle is desired the wall surface may be a conical or similar frustum (using this term in a broad sense to cover forms which are not of circular section but may be made up of other curves or of curves and straight lines), the apex angle, which may be up to say 90° being chosen to give a negative, zero or positive front rake angle as may be desired. The rake angle may range from 30° negative to 30° positive but will usually be from 5° negative to 20° positive.

Where there is a narrow land extending to the cutting edge to give a true clearance angle different from that between the general plane of the main part of the clearance face and the workpiece it will be understood the relationship between the rake angle and the clearance angle above described will apply to the rake angle and the angle between the main part of the clearance face and the workpiece.

It will be clear that if the side wall is normal to the clearance face, as the bit is a parallel-faced slice, there will be two edges, a part of either of which can serve as the cutting edge provided the outline is of such symmetrical form as to allow the bit to be presented either way up. This is manifestly the case with a circular outline when the bit is a short cylinder; lobed forms can also easily satisfy this requirement. Then when the whole of one edge has been used by indexing successive portions, the bit can be turned over and the other edge used, thus enabling greater use to be made of the material before being thrown away or reground.

In the case of a side wall at an angle to provide a different clearance angle or rake angle, the bit can still be made double sided by making it taper from both faces to a minimum area of cross section. It is unlikely that such a value of negative rake would ever be required which would involve tapering the other way but if needed it is equally possible to make a bit so tapered which could be turned over.

The possibility of turning the bit over applies also to cases in which a narrow flat land is formed adjacent each cutting edge to provide a reduced true clearance angle.

The invention will be further described with reference to examples diagrammatically illustrated in the accompanying drawings.

FIG. 1 is a perspective view from below of a face milling tool in accordance with the present invention with a bit of circular outline.

FIG. 2 is a detail section looking in the direction of the arrow II in FIG. 1, without any transverse inclination of the bit being shown.

FIG. 3 is an elevation taken in the direction of the arrow III in FIG. 2, showing transverse inclination or tilting of the bit.

FIGS. 4 to 7 and 9 are plan views from below of further forms of bit for tools in accordance with the invention.

Figure 6:
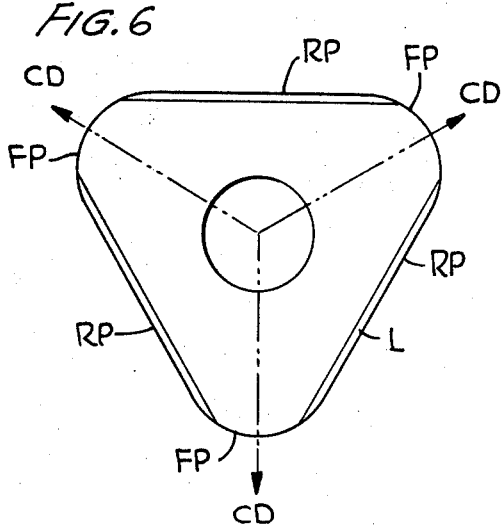

The face milling tool in accordance with the invention shown in FIGS. 1 and 2 comprises a holder or body 11 carrying a bit 12 of circular outline, in the form of a parallel faced frusto-conical slice of cutting material (e.g. high speed steel or so-called "hard metal" such as tungsten carbide granules held in a matrix of cobalt). The cutting edge 13 is formed by the junction of conical side 14 with the larger outer flat face 15 of the bit and the manner in which the bit is presented to the workpiece 16 is determined by a flat-faced seating here formed on a boss 17 on the body 11 against which the inner flat face 18 of the bit is pressed by a clamping screw 19 the head of which is received in a countersink in the bit.

The direction of rotation of the tool is indicated by the arrow M in FIG. 1 and the cutting direction by the arrow N in FIG. 2. As FIG. 2 shows the boss 17 is shaped so that the outer flat face 15 of the bit is the clearance face and makes a clearance angle with the machined surface of the workpiece 16, while the front rake angle $\beta$ is equal to the semi-apex angle of the cone less $\alpha$. Instead of the seating being formed on a boss it may be wholly or partly recessed into the body 11.

FIG. 2 assumes that the axis of the screw 19 lies in the plane of the drawing, i.e. a plane perpendicular to the plane of the machined surface of the workpiece. This will usually be the case but the axis of the screw may be tilted through a small angle $\gamma$, FIG. 3, in other words the clearance face 15 may be tilted away from the feed direction (arrow F) by the small angle $\gamma$; this may also be regarded as a transverse tilt with respect to the cutting direction. FIG. 3 also shows the angular length $\delta$ of the cutting edge for a depth of cut $d$, the clearance angle $\alpha$, and diameter D of the face 15 of the bit.

The dotted line 21 indicates the boundary of the cross-section of the chip produced for a feed increment of $f$; it will be seen that the chip diminishes in thickness from a maximum at the end (trailing in the cutting direction but leading in the feed direction of the cutting edge) down to zero at the foremost point of the cutting edge.

The obliquity of the cutting edge to the cutting direction is zero at the leading end of the cutting edge, and increases towards the trailing end of the cutting edge. As above noted the tangent at the trailing end should not be at less than about 30° to the feed direction F if satisfactory cutting is to be achieved, which means that the angle $\delta$ must not exceed 60° (with some very slight variation due to the setting of the face 15 at the angles $\alpha$ and $\gamma$). Consideration of FIGS. 2 and 3 will show that as either of the angles $\alpha$ and $\gamma$ are increased, the depth of cut $d$ will increase for a given value of the angular length $\delta$.

It will also be clear from FIGS. 1 to 3 that when the cutting edge is blunted or worn, by loosening the screw 19, the bit can be indexed through a sufficient angle to bring at least a new finishing part of the cutting edge into action and then be tightened. If the angle is at least $\delta$ a wholly new cutting edge will be brought into action. The face 18 of the bit and of the boss 17 can be serrated or recessed to improve the grip, or pins or other means may be used to prevent slip if necessary, since the cutting reaction does not pass through the axis of the screw 19 and therefore exerts a turning moment on the bit. An arrangement which positively prevents slip and facilitates indexing will be described later.

Since the tools according to the invention effect both a coarse cut and a finishing cut, no rough machining operation is necessary unless the depth of material to be removed from the workpiece is greater than can be dealt with by the tool. In particular cases if it should be necessary the holder 11 can have a number of roughing bits distributed round it as indicated in dotted lines at 22 in FIG. 1. These bits 22 may be of conventional shape in the form of throw-away inserts. It is important that that part of the cutting edge of the bit 12 which first contacts the workpiece should be nearer to the axis of the holder 11 than the corresponding parts of the roughing bits 22 i.e. the radial distance R1 in FIG. 1 should be smaller than the distance R2, so that the roughing bits machine the workpiece before the bit 12 engages it.

FIGS. 1 to 3 show the use of a bit of simple circular outline. As explained above the effective radius of the cutting edge and or the angular length of cutting edge can be increased without excessive obliquity or the maximum angle of obliquity be decreased for a given angular length of cutting edge by modifying a simple circular arcuate form, thus enabling the volume of the bit to be reduced for a given section of chip. The remaining figures relate to examples.

A cutting edge in the form of a continuous curve of decreasing curvature (i.e. which increases in radius) in proceeding from the finishing to the coarse cutting part, which has the desired result is shown in inverted plan in FIG. 4 in which for one cutting edge the cutting direction is marked CD and the tangent at 30° is marked T while the ends of the length of the cutting edge are marked $e, e$.

Here the cutting edge comprises an arcuate finishing part of small radius and a coarse cutting part of large radius, so that the curvature decreases in one step. The rest of the outline is obtained by completing the arcs. There may however be more than one step in the decreasing curvature, or the decrease itself may be continuous as above explained.

The bit shown in FIG. 4 can be presented so that the cutting direction intersects a large radius part of the edge so that the radius of the whole of the cutting edge is very much greater than the average radius of the bit. In such case the small radius parts of the edge are not parts of the cutting edge but merely rounding off of what would otherwise be sharp intersections. When the bit is used in this way only a fraction say one half of each long arc can be used as the cutting edge, but economy can be effected by indexing. However this needs some care and skill and it is preferred to make a bit to be used in this way with more lobes so that it can be economically used without the need for indexing. Then angular locating means can be employed to ensure correct presentation. A preferred number of lobes is six as this enables the greater part of the arcuate edge to be used as a cutting edge without difficulties due to obliquity and calculation shows that other things being equal six lobes keeps the total volume of the bit to a minimum. The arcuate edges can be simple circular arcs.

Such a six lobed bit is illustrated in FIG. 5. There are six arcuate edges E the junctions being rounded off at R merely to avoid sharp corners. The length of edge used as a cutting edge may approximate to $e—e$ while to ensure correct presentation the bit can conveniently be angularly located on the seating by lugs or bosses indicated at B, positioned to engage two edges E remote from the edge which actually cuts indicated by $e — e$ and the cutting direction CD. The lugs must not project beyond the thickness of the bit to avoid fouling the workpiece. Other angular locating means such as described below with reference to FIGS. 9 and 10 could also be used.

Figure 9:
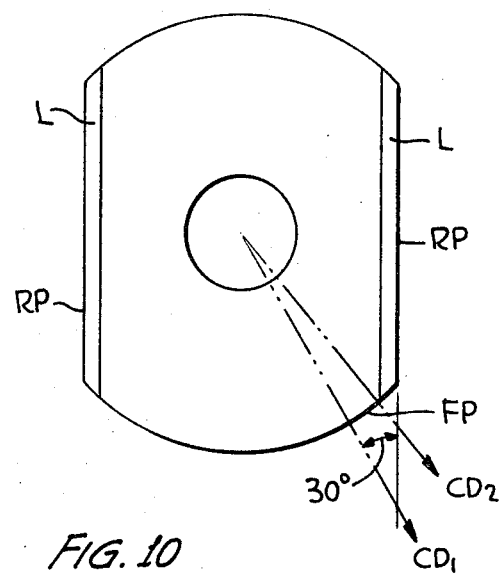
Figure 7:
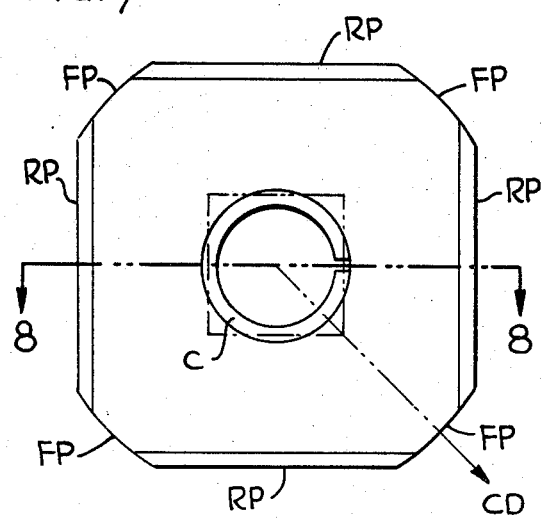

Forms in which the cutting edge is made up of a curved, e.g. simple circular arcuate finishing part and a coarse cutting part of a single straight section are illustrated in FIGS. 6, 7 and 9.

A maximum obliquity (30° between a straight coarse cutting part and the cutting direction) and provision for indexing leads to an equilateral triangular form with the apices replaced by arcuate finishing parts, as shown in inverted plan in FIG. 6, in which the three arcuate finishing parts are marked FP, the three coarse cutting parts RP, and the cutting direction CD.

Figure 8:
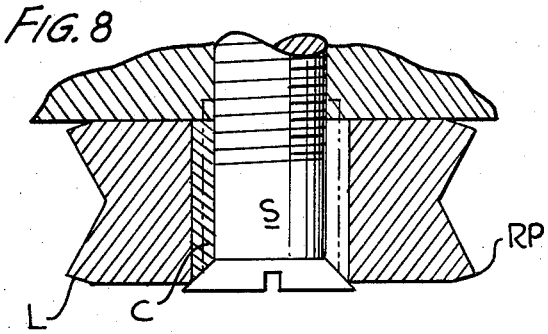
FIG. 8 is a section of FIG. 7 on the line VIII—VIII.
Figure 11:
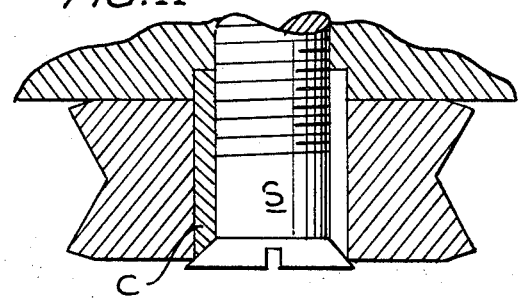

If less obliquity is allowed, say 45°, a square form with the corners replaced by arcuate finishing parts results as shown in inverted plan FIG. 7, and in section in FIG. 8, in which the four finishing parts are marked FP, the four coarse cutting parts RP and the cutting direction CD. In this case since 45° is well above the practical limit of 30°, some adjustment of the direction CD is possible without difficulty arising, for instance for adjusting the width of the chip cut by the finishing part as will be explained later.

FIG. 9 illustrates in inverted plan another possible form which incorporates only two repeats but which enables the cutting direction to be anywhere between $CD_1$ at which the obliquity is 30° and $CD_2$ at which the finishing part is at a minimum length. The part of the convex curve which does not actually cut could be of any form which avoided interference but a circular arc over the whole length is simple to produce. The complete outline thus becomes two opposite concentric circular arcs of equal length and two parallel straight sides.

The above are only examples and other forms are possible within the scope of the invention.

As above described to enable the depth of cut with a given size to be increased the bit is presented with its under outer face inclined at a greater angle then would normally be chosen for a clearance angle. It is found that if the narrow zone of the clearance face actually extending to the cutting edge is coplanar with the general flat outer surface of the bit, this is likely to cause at least the coarse cutting part of the cutting edge to be damaged near the trailing ends because the effective clearance angle of the coarse cutting part is greater than the angle of inclination of the clearance face as a whole. To deal with this a narrow land marked L in FIGS. 4 and 6 to 9 may be provided on the outer face extending back from the cutting edge, thereby to reduce the effective clearance angle to a more appropriate value. This land can be provided along the whole cutting edge, but it is found that the arcuate finishing part is much less prone to damage and the land may be omitted from this part. Such a land can also be provided on bits of circular outline, either along the parts or parts intended only for coarse cutting or round the whole periphery. The land is shown flat but may be of slightly curved section if the mode of production makes this more convenient.

It is found that in machining some materials the width of chip removed by the foremost arcuate finishing part of the cutting edge affects the surface finish of the workpiece. With bits of the forms shown in FIGS. 4 and 6 to 9 and other similar forms, this width can be adjusted as necessary by adjusting the precise setting of the bit in relation to the cutting direction. Such adjustment may be made by rotation on the axis of a single central screw holding the bit, but it may be necessary to adjust means on the holder which determines the setting of the bit.

Figure 10:
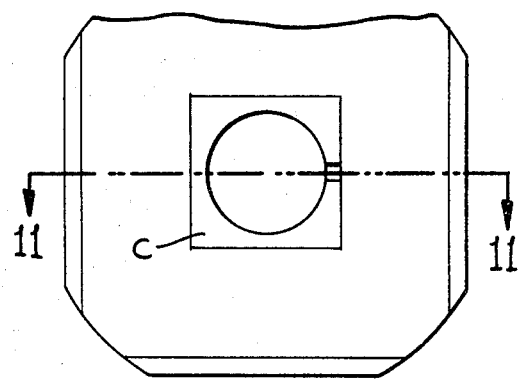
FIGS. 10 and 11 are similar views to FIGS. 7 and 8 showing a clamping arrangement for the bit which determines its angular location.

Bits according to the invention may be produced or finished by grinding and similar operations i.e. abrasive processes from stock material, or be sintered to final form from so-called hard metals. In the latter case it may be possible to dispense with grinding or similar operation on the side wall but usually overall thickness is of importance, thus requiring grinding of the inner and outer surfaces.

Where including by rotation on a holding screw is to be provided for, one suitable way of holding the bit is by a countersink headed screw S, FIG. 8, which does not engage a countersink in the bit itself, but a countersink in a gapped sleeve C, the screw just clamping down the sleeve and then expanding it in the bore in the bit. The bit needs to be held down on the holder during tightening of the screw. As shown the sleeve is cylindrical on its external surface and the bore in the bit matches so that there is no impediment to indexing through any angle or locking against slipping. If the bore in the bit is given a non-circular section (e.g.polygonal) and the external surface of the sleeve matches, and the sleeve enters a corresponding recess in the holder, a positive lock is obtained and positive control of indexing if the latter is permitted at all. With the bit as in FIGS. 7 and 8 which needs to be indexed into four positions, the sleeve and bore may be of square section as indicated in FIGS. 9 and 10. As also indicated by these Figures, the sleeve enters a recess of the same cross section in the holder. Other sections will be used for other numbers of indexing positions to be provided for and similar arrangements may be used for circular bits.

FIG. 8 also illustrates an example of a bit which while having an inclined sidewall, has an edge at both faces, parts of which can be used as cutting edges, i.e. a bit which tapers from both faces and can be turned over. This scheme is generally applicable to a bit of any outline.

By way of example a bit used in a tool according to the present invention may be from one-eighth to three-eighth inch thick and its diameter may be from ½ to 1½ inches.

What we claim is:

1. A face milling tool comprising a holder securable to the end of a rotatable spindle, a bit member having at least one cutting edge and being detachably secured to the outer surface of said holder at a radial distance from the axis of said spindle, said bit member cutting edge extending outwardly of said holder outer surface so that said cutting edge is free to engage and machine the surface of a workpiece, said holder being provided with an integral seating against the outer surface of which said bit is positioned, said bit being of slice-like form, means for detachably securing said bit to said holder through a central axial aperture in said bit, said securing means lying within the outer end face of said bit, said bit member cutting edge being formed by a portion of an edge at the intersection of the bit side wall and said end face at a distance from said seating outer surface, said cutting edge having a convex contour over at least part of its length, said seating outer surface lying at such an angle in each of two directions with respect to said spindle axis as to locate said bit to present it to the workpiece with said bit side wall forming a rake-face and said outer end face of said bit forming a clearance face making a low angle to the plane of the workpiece disposed perpendicularly to said spindle axis whereby said convex contour will first engage and cut deepest into the workpiece with the thickness of the chip so cut diminishing to zero at the greatest depth of cut, and said seating outer surface so lying at such an angle that a tangent to the end of said cutting edge makes an angle of at least 30° to the cutting direction, i.e., to a tangent to the circle described by the point of engagement of said cutting edge with the workpiece.

2. A face milling tool as set forth in claim 1 in which said seating is transversely tilted with respect to the feed direction at a small angle in such direction as to present the bit tilted to increase the depth of cut.

3. A face milling tool as set forth in claim 1 in which said bit is circular in outline.

4. A face milling tool according to claim 3 in which said securing means for said bit comprises a screw having a head countersunk into said aperture in said bit whereby said securing means may be screwed into said holder.

5. A face milling tool as set forth in claim 1 in which said bit is lobed, all the lobes being of identical form, each lobe having a cutting edge of curved contour of substantially larger radius than the average radius of the bit, and said securing means enabling the bit to be indexed to bring each cutting edge into cutting position in turn.

6. A face milling tool as set forth in claim 5 in which said bit has six lobes.

7. A face milling tool as set forth in claim 5 in which said holder has lugs engaging at least one side of said bit remote from that lobe the edge of which is serving as the cutting edge, thereby to determine the angular location of the bit in relation to the cutting direction.

8. A face milling tool as set forth in claim 1 also having at least one roughing bit secured to said holder on the same side as said slice-like bit and located further from the axis of rotation of the tool than said slice-like bit.

* * * * *